(12) United States Patent
Kawabe et al.

(10) Patent No.: US 9,100,905 B2
(45) Date of Patent: Aug. 4, 2015

(54) MOBILE COMMUNICATION METHOD, CONTROL DEVICE, AND EXCHANGE

(75) Inventors: Yasuhiro Kawabe, Yokosuka (JP); Masafumi Masuda, Yokosuka (JP)

(73) Assignee: NTT DOCOMO, INC., Tokyo (JP)

( * ) Notice: Subject to any disclaimer, the term of this patent is extended or adjusted under 35 U.S.C. 154(b) by 796 days.

(21) Appl. No.: 13/375,054

(22) PCT Filed: May 28, 2010

(86) PCT No.: PCT/JP2010/059122
§ 371 (c)(1),
(2), (4) Date: Nov. 29, 2011

(87) PCT Pub. No.: WO2010/137698
PCT Pub. Date: Dec. 2, 2010

(65) Prior Publication Data
US 2012/0077490 A1    Mar. 29, 2012

(30) Foreign Application Priority Data
May 29, 2009  (JP) ................. 2009-130826

(51) Int. Cl.
*H04W 8/04* (2009.01)
*H04W 60/00* (2009.01)
*H04W 48/20* (2009.01)
*H04W 60/04* (2009.01)
*H04W 84/04* (2009.01)

(52) U.S. Cl.
CPC .............. *H04W 48/20* (2013.01); *H04W 60/04* (2013.01); *H04W 84/045* (2013.01)

(58) Field of Classification Search
CPC ... H04W 84/045; H04W 48/16; H04W 12/06; H04W 60/04; H04W 48/20
USPC ........... 455/422.1, 432.1, 433, 434, 436–444, 455/450, 435.1
See application file for complete search history.

(56) References Cited

U.S. PATENT DOCUMENTS

| | | | |
|---|---|---|---|
| 2004/0005897 A1* | 1/2004 | Tomoe et al. | ................. 455/450 |
| 2010/0151864 A1 | 6/2010 | Mori | |

(Continued)

FOREIGN PATENT DOCUMENTS

| WO | 2008 139901 | 11/2008 |
|---|---|---|
| WO | 2009 063994 | 5/2009 |
| WO | 2009 066417 | 5/2009 |

OTHER PUBLICATIONS

Office Action issued on Nov. 1, 2013 in the corresponding Chinese Patent Application No. 201080023725.2 (with English Translation).

(Continued)

*Primary Examiner* — Ajit Patel
(74) *Attorney, Agent, or Firm* — Oblon, McClelland, Maier & Neustadt, L.L.P.

(57) ABSTRACT

In a mobile communication method according to the present invention, in a communication start procedure of a mobile station camps on a femtocell, acquiring, by an exchange 20, a frequency of the femtocell and a femtocell ID for uniquely identifying the femtocell which are held in a controller 10, storing, by the exchange 20 and a home location register 30, the acquired frequency of the femtocell and the acquired femtocell ID in association with subscriber information of the mobile station UE, performing, by the exchange 20 and the home location register 30, location registration to register the mobile station UE for a location registration area to which the femtocell geographically overlaid with the macrocell belongs, in response to the received location registration request signal, in a release procedure of the radio connection after completion of the location registration, notifying, by the controller 10, the mobile station UE of the notified frequency of the femtocell notified by the exchange 20.

6 Claims, 6 Drawing Sheets

(56) References Cited

U.S. PATENT DOCUMENTS

| | | |
|---|---|---|
| 2010/0267385 A1 | 10/2010 | Iwamura et al. |
| 2011/0028152 A1 | 2/2011 | Okada |
| 2012/0258711 A1* | 10/2012 | Bao et al. ............... 455/434 |
| 2014/0045495 A1* | 2/2014 | Deshpande et al. ......... 455/434 |
| 2014/0199998 A1* | 7/2014 | Balasubramanian et al. 455/434 |

OTHER PUBLICATIONS

3GPP TS 23.008 V11.1.0., $3^{rd}$ Generation Partnership Project; Technical Specification Group Core Network and Terminals; Organization of subscriber data (Release 11) pp. 1-104. (Sep. 2011).

3GPP TS 25.331 V10.5.0., 3rd Generation Partnership Project; Technical Specification Group Radio Access Network; Radio Resource Control (RRC); Protocol specification (Release 10), pp. 1-1883. (Sep. 2011).

3GPP TSG RAN #35 RP-070209, Orange, Telecom Italia, T-Mobile, Vodafone, "Requirements of LTE Home eNodeBs", total 4 pages. (Mar. 6-9, 2007).

International Search Report issued on Aug. 17, 2010 in PCT/JP10/059122 filed on May 28, 2010.

Notice of Grounds for Rejection issued Nov. 6, 2012 in Japanese Patent Application No. 2011-516074 (with English translation).

Office Action issued Jun. 3, 2014, in Chinese Patent Application No. 201080023725.2 with English translation.

* cited by examiner

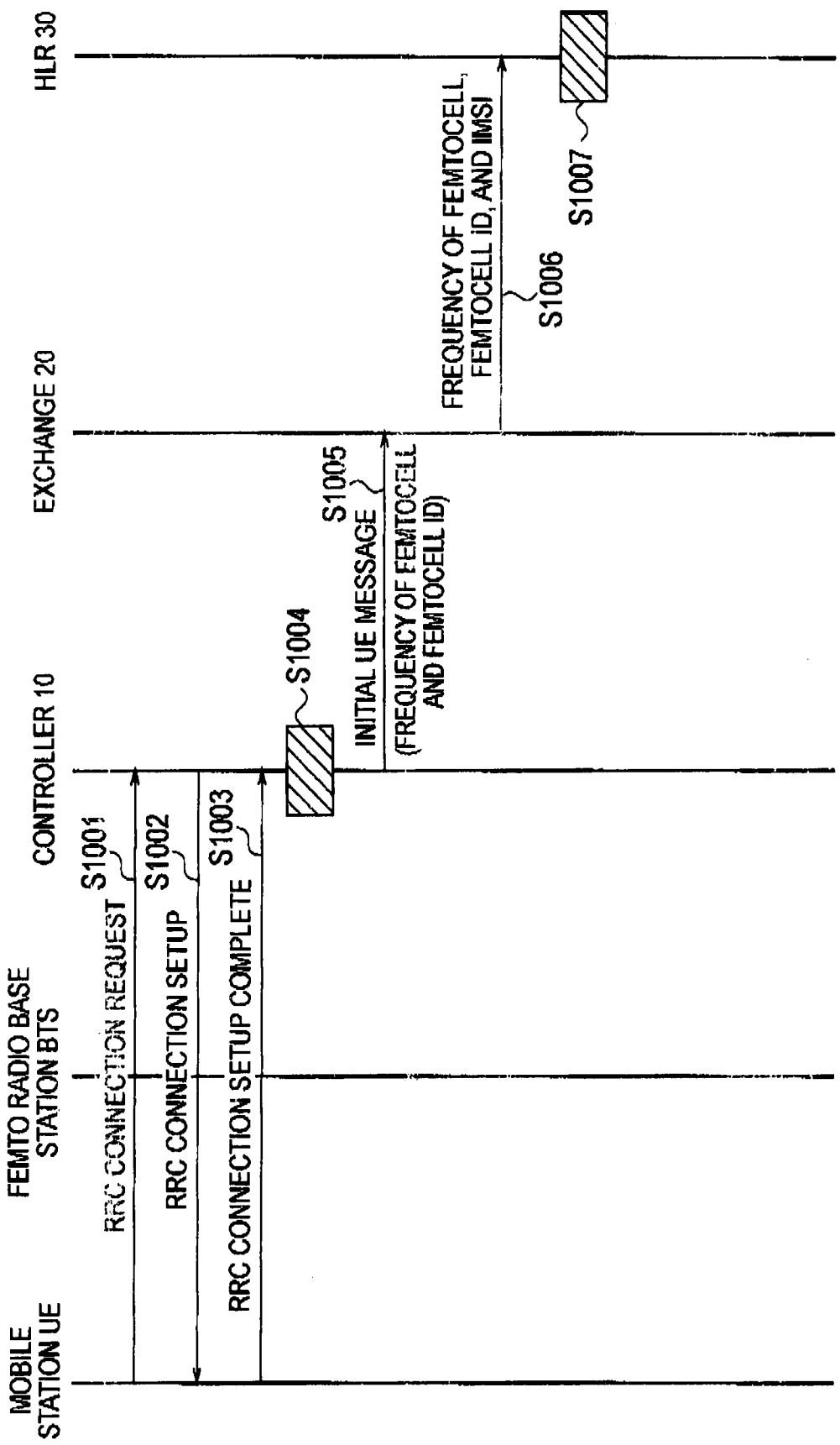

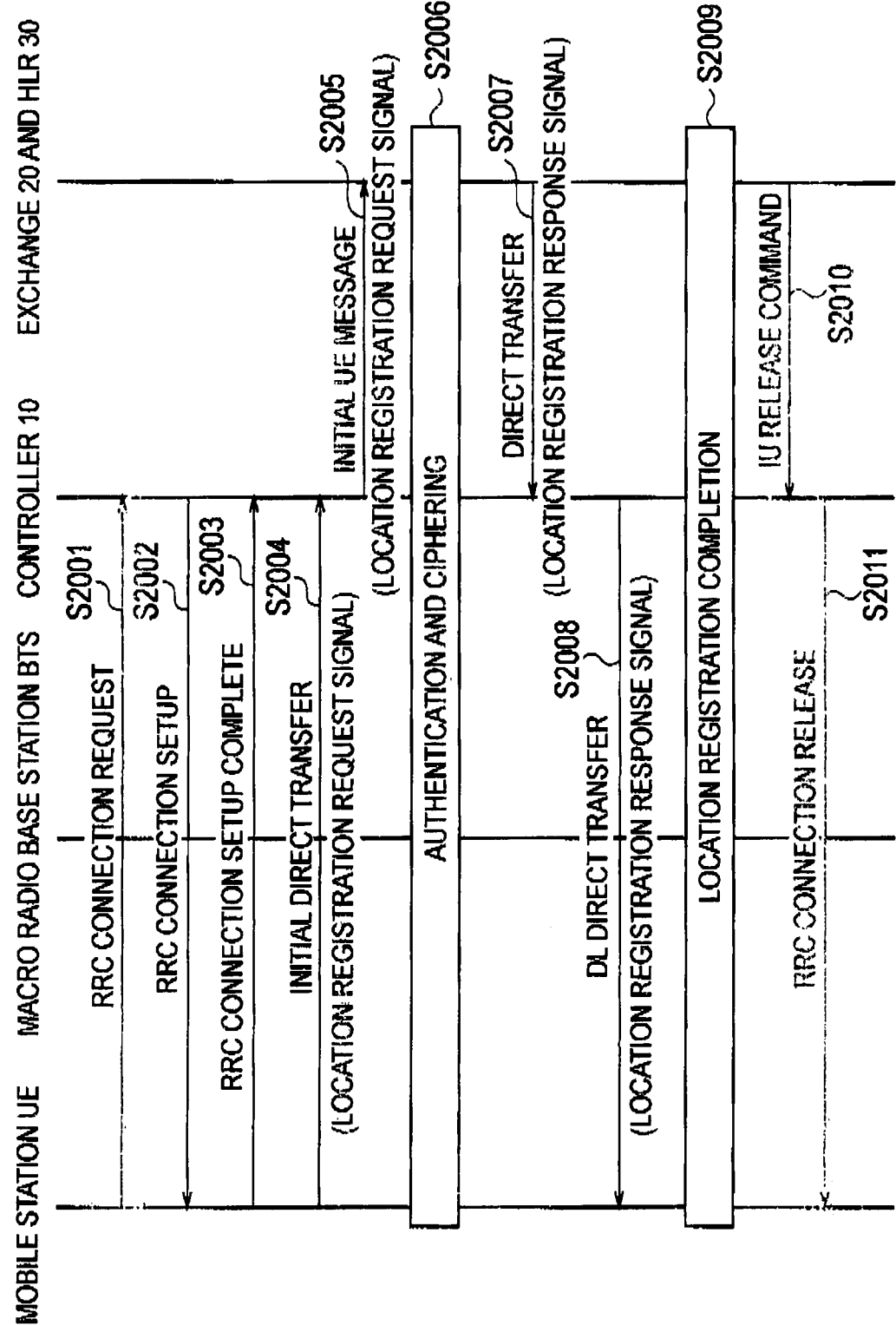

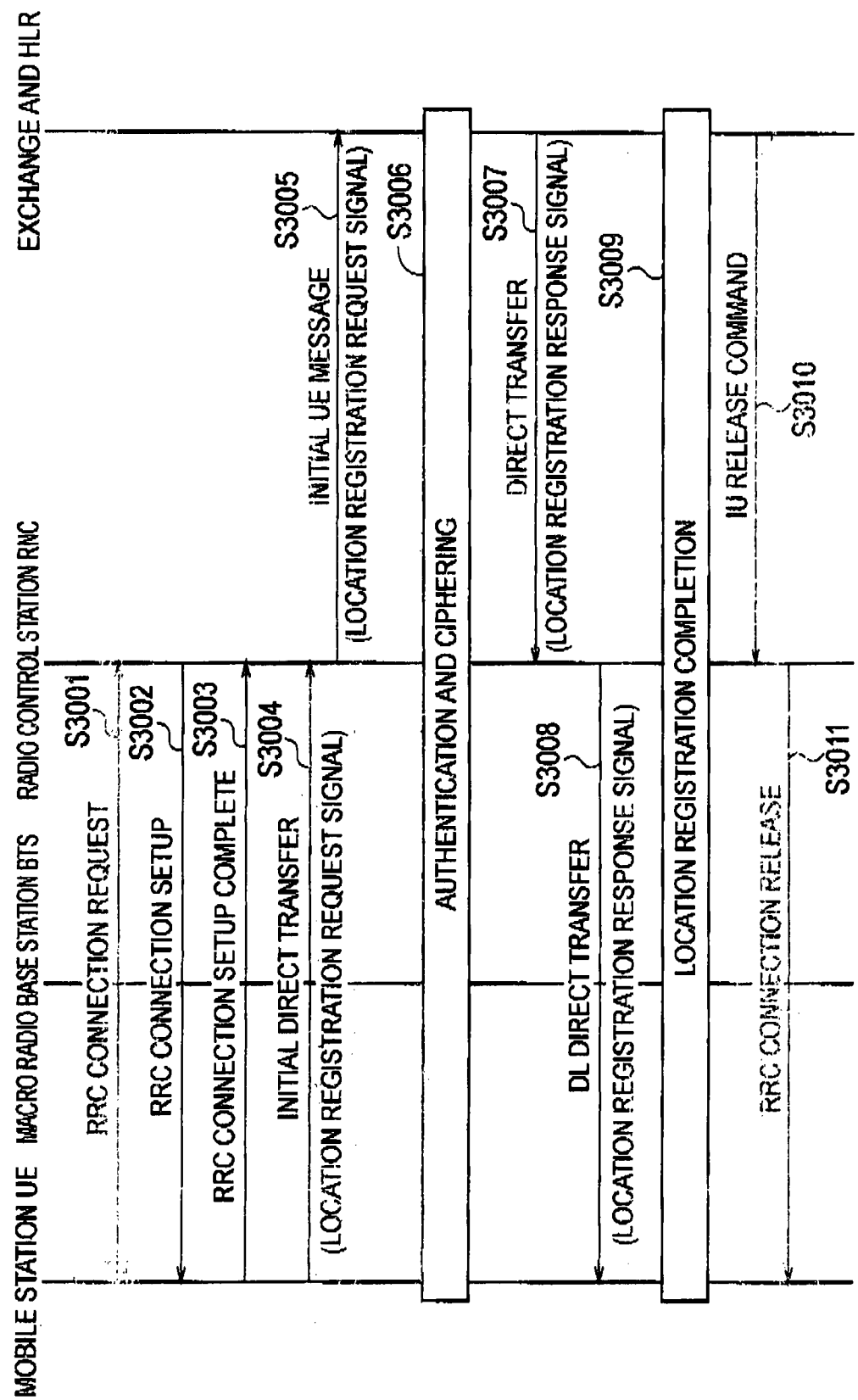

MOBILE COMMUNICATION METHOD, CONTROL DEVICE, AND EXCHANGE

TECHNICAL FIELD

The present invention relates to a mobile communication method, a control device, and an exchange.

BACKGROUND ART

In recent years, there has been proposed an ultra-small radio base station (femto radio base station) BTS which provides a cell (femtocell) having a radius of approximately several tens of meters.

Since the femtocell under control of the femto radio base station BTS is utilized by a small number of mobile stations UEs, a high-speed service using a wide frequency band can be provided.

In addition, since the femto radio base station BTS is installed in a subscriber premise or the like, the femto radio base station BTS is believed to provide new services merged with a fixed communication service subscribed to by a subscriber.

In a general household, a small office or the like, a single or multiple femtocells can form a private area specific to a particular user by minimizing the coverage area of each femtocell, or by applying an inexpensive local IP line to connection between each femto radio base station BTS and a radio network controller RNC.

Meanwhile, a discussion is being made to provide "user exclusive services," that is, to provide particular users with a charging system special to a femtocell, an added function only in a femtocell, and the like.

In the femtocell providing such user-exclusive services, a mobile station UE of a particular user allowed to access the femtocell is desired to be preferentially guided to the femtocell.

By referring to FIG. 1 and FIG. 8, a description is given of an operation of performing a location registration of a mobile station based on a conventional W-CDMA scheme.

In examples in FIG. 1 and FIG. 8, a description is given of an operation performed when a mobile station UE in a camp-on state in a macrocell 1 operated. at a frequency f1 moves to a macrocell 2 operated at a frequency f2. Note that the macrocell 1 and the macrocell 2 belong to different location registration areas.

As shown in FIG. 8, in Step S3001, when detecting a change of a location registration area on which the mobile station UE visits after moving to the macrocell 2, the mobile station UE transmits "RRC CONNECTION REQUEST" requesting an establishment of an RRC connection, to a radio network controller RNC through the macrocell 2.

In Step S3002, the radio network controller RNC transmits "RRC CONNECTION SETUP" to the mobile station UE. In Step S3003, the mobile station UE transmits "RRC CONNECTION SETUP COMPLETE" to the radio network controller RNC, and thereby the establishment of the RRC connection between the radio base station RNC and the mobile station UE is completed.

In Step S3004, the mobile station UE transmits a location registration request signal (ROUTING AREA UPDATE REQUEST) to the radio network controller RNC by using "INITIAL DIRECT TRANSFER" which is an RRC message.

In Step S3005, the radio network controller RNC having received "INITIAL DIRECT TRANSFER" forwards the received location registration request signal by using "INITIAL UE MESSAGE" which is an RANAP message.

After authentication and ciphering processing for the mobile station TIE succeeds in Step S3006, an exchange transmits a location registration response signal to the radio network controller RNC by using "DIRECT TRANSFER" which is an RANAP message in Step S3007. The location registration response signal is for permitting location registration to register the mobile station UE for a location registration area to which the macrocell 2 belongs. In Step S3008, the radio network controller RNC forwards the received location registration response signal to the mobile station UE by using "DL DIRECT TRANSFER" which is an RRC message, and thereby the location registration of the mobile station UE for the location registration area to which the macrocell 2 belongs is completed (Step S3009).

In Step S3010, the exchange sends the radio network controller RNC "IU RELEASE COMMAND" which is an RANAP message instructing release of the aforementioned RRC connection.

In Step S3011, the radio network controller RNC having received "IU RELEASE COMMAND" transmits "RRC CONNECTION RELEASE" to the mobile station UE and thereby releases the aforementioned RRC connection.

In 3GPP specifications, the radio network controller RNC is configured to designate a camp-on frequency of the mobile station UE by using such "RRC CONNECTION RELEASE."

PRIOR ART DOCUMENTS

Non-Patent Documents

NON-PATENT DOCUMENT 1: 3GPP TS23.008
NON-PATENT DOCUMENT 2: 3GPP TS25.331
NON-PATENT DOCUMENT 3: 3GPP TSG RAN#35 RP-070209, Lemesos, Cyprus, Mar. 6-9, 2007

SUMMARY OF THE INVENTION

Problems to be Solved by the Invention

Such a mobile communication system, however, has a problem that even though a femtocell is geographically overlaid with the aforementioned macrocell 2, a mobile station UE allowed to access the femtocell cannot be registered in location registration preferentially for the location registration area to which the femtocell belongs.

For example, suppose a case where a femtocell at the frequency f2 is installed and where a mobile station UE camps on the frequency f1. Even though the mobile station UE is located near the femtocell, the mobile station UE cannot detect the femtocell because the used frequency is different. As described above, in the 3GPP specifications, the camp-on frequency of the mobile station UE is designated by using "RRC CONNECTION RELEASE," but a device (RNC) on the network side does not recognize the used frequency in the femtocell. Thus, there is a problem that the mobile station UE cannot always camp on the frequency used in the femtocell.

Hence, the present invention has been made in view of the aforementioned problems. An objective thereof is to provide a mobile communication method, a control device, and an exchange which are capable of performing location registration to register a mobile station UE allowed to access a femtocell, preferentially for a location registration area to which the femtocell belongs.

Means for Solving the Problems

The first feature of the present invention is summarized in that a mobile communication method including: step A of, in a communication start procedure of a mobile station camps on a femtocell, acquiring, by an exchange, a frequency of the femtocell and a femtocell ID for uniquely identifying the femtocell which are held in a controller; step B of storing, by the exchange and a home location register, the acquired frequency of the femtocell and the acquired femtocell ID in association with subscriber information of the mobile station; step C of transmitting a location registration request signal to the exchange by the controller, the location registration request signal having been transmitted from the mobile station visiting a macrocell through a radio connection established with the mobile station; step D of performing, by the exchange and the home location register, location registration to register the mobile station for a location registration area to which the femtocell geographically overlaid with the macrocell belongs, in response to the received location registration request signal; in a release procedure of the radio connection after completion of the location registration, step E of notifying, by the exchange, the controller of the frequency of the femtocell, and of notifying, by the controller, the mobile station of the notified frequency of the femtocell; and step F of starting, by the mobile station, camps on the notified frequency of the femtocell.

The second feature of the present invention is summarized in that a controller including: an exchange notification unit configured to, in a communication start procedure of a mobile station camps on a femtocell, notify an exchange of a frequency of the femtocell and a femtocell ID for uniquely identifying the femtocell which are held in the controller; a location registration request signal transmission unit configured to transmit a location registration request signal to the exchange, the location registration request signal having been transmitted from the mobile station visiting a macrocell through a radio connection established with the mobile station; and a mobile-station notification unit configured to notify the mobile station of the frequency of the femtocell notified by the exchange in a release procedure for the radio connection after location registration, when the exchange performs the location registration to register the mobile station to a location registration area to which the femtocell geographically overlaid with the macrocell belongs in response to the received location registration request signal.

The third feature of the present invention is summarized in that an exchange, including: an acquisition unit configured, in a communication start procedure for a mobile station camps on a femtocell, to acquire a frequency of the femtocell and a femtocell ID for uniquely identifying the femtocell which are held in a controller; a storage unit configured to store the acquired frequency of the femtocell and the acquired femtocell ID in association with subscriber information of the mobile station in cooperation with a home location register; a location registration processing unit configured to perform location registration, when the controller sends the exchange a location registration request signal transmitted from the mobile station through a radio connection with the mobile station, to register the mobile station visiting a macrocell for a location registration area to which the femtocell geographically overlaid with the macrocell belongs, in response to the received location registration request signal; and a controller notification unit configured to notify the controller of the frequency of the femtocell in a release procedure of the radio connection after the location registration.

Effect of the Invention

As described above, the present invention can provide a mobile communication method, a control device, and an exchange which are capable of performing location registration to register a mobile station UE allowed to access a femtocell, preferentially for a location registration area to which the femtocell belongs.

BRIEF DESCRIPTION OF THE DRAWINGS

FIG. 6 is a sequence diagram showing an operation of a mobile communication system according to the first embodiment of the present invention.

FIG. 7 is a sequence diagram showing an operation of the mobile communication system according to the first embodiment of the present invention.

FIG. 8 is a sequence diagram showing an operation of a conventional mobile communication system.

MODE FOR CARRYING OUT THE INVENTION

Configuration of Mobile Communication System According to First Embodiment of Present Invention A description is given of a mobile communication system according to a first embodiment of the present invention by referring to FIGS. 1 through FIG. 5.

Figure 1:
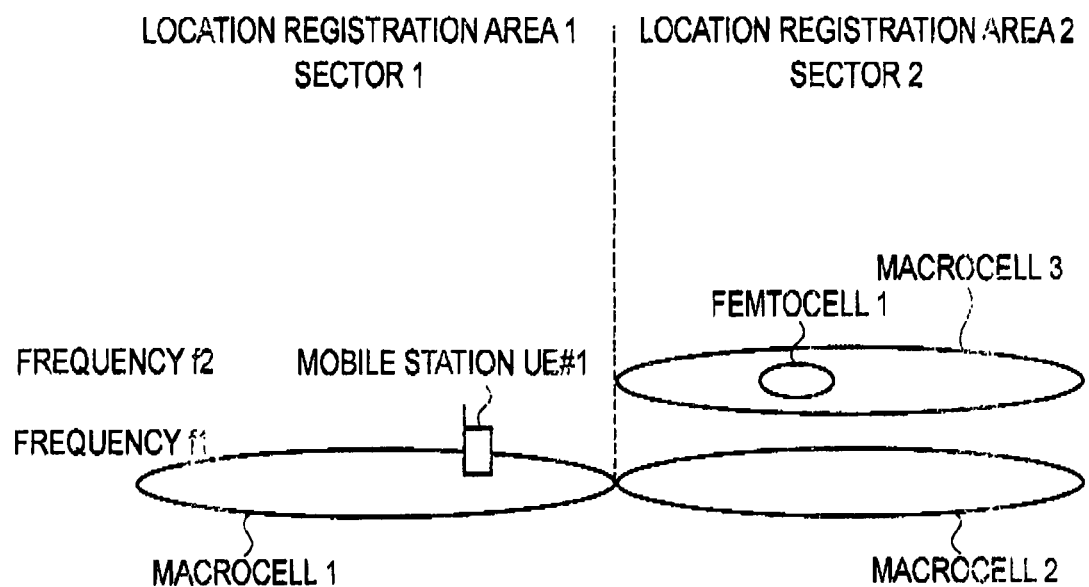
FIG. 1 is an overall configuration diagram of a mobile communication system according to a first embodiment of the present, invention.

As shown in FIG. 1, the mobile communication system according to this embodiment is a mobile communication system using a W-CDMA scheme and is mainly divided into a radio access network (RAN) configured to perform radio access control and a core network (CN) configured to perform movement management, call control, and service control.

RAN includes radio base stations BTSs (macro radio base stations and femto radio base stations) and a controller 10, while CN includes an exchange 20, a home location register (HLR) configured to register a subscriber profile (subscriber information) and a location of a mobile station, and the like.

In such a mobile communication system, a mobile station UE in a camp on state is configured to measure electric fields of pilot channels (CPICHs: Common Pilot Channels) transmitted by radio base stations in respective cells and to autonomously select an optimum CPICH. The mobile station UE has been switched on but is not in communication, that is, stands by for an outgoing call operation resulting from an operation of a terminal by a user or an incoming call resulting from calling.

Specifically, the mobile station UE having selected the optimum CPICH, that is, an optimum cell, is configured to read broadcast information of the cell and to camp on the cell.

In the example shown in FIG. 1, the macrocell 1 and the macrocell 2 are operated at the frequency f1, and a macrocell 3 and a femtocell 1 are operated at the frequency f2, Note that a macrocell 4 and a femtocell 2, which are not illustrated, are operated at a frequency f3.

In addition, the macrocell 2, the macrocell 3, the macrocell 4, the femtocell 1, and the femtocell 2 employ a configuration of geographical overlaying in the same sector.

A sector 1 and a sector 2 have different location registration areas. When the mobile station UE moves across a boundary between the sectors, location registration is performed.

Meanwhile, a user having a mobile station UE#1 is a subscriber user permitted communication in the femtocell 1 and the femtocell 2, while the other users are users who cannot perform communication in the femtocell 1 and the femtocell 2. Note that a home of a user 1 exists in the sector 2.

In other words, the mobile station UE#1 is a mobile station allowed to access the femtocell 1 and the femtocell 2, and mobile stations UE of the other users cannot access the femtocell 1 and the femtocell 2.

Figure 2:
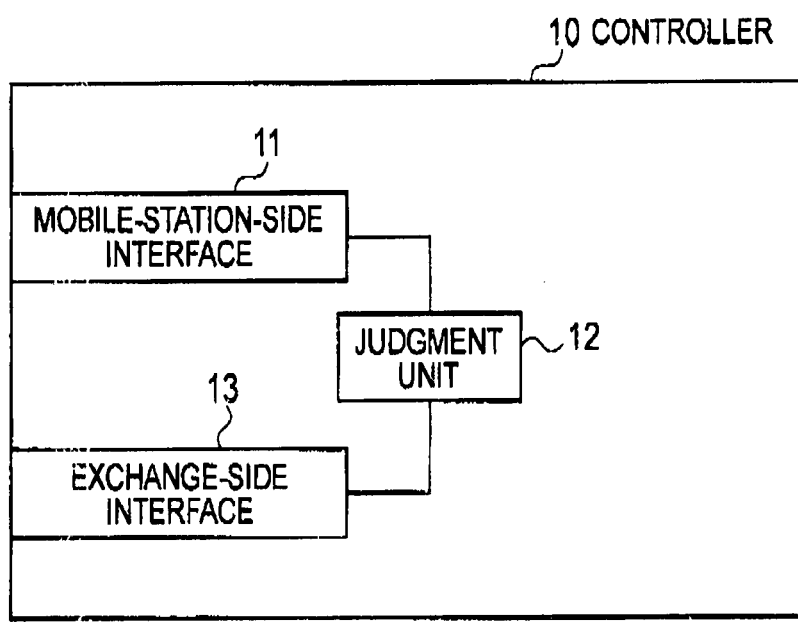
FIG. 2 is a functional block diagram of a controller according to the first embodiment of the present invention.

As shown in FIG. 2, the controller 10 includes a mobile-station-side interface 11, a judgment unit 12, and an exchange-side interface 13.

Note that functions of the controller 10 may be provided in an radio network controller RNC in a mobile communication system using the W-CDMA scheme, may be provided in a macro radio base station eNB in the mobile communication system using the w-CDMA scheme, or may be provided in a gateway device accommodating a femto radio base station BTS.

The mobile-station-side interface 11 is configured to fulfill a function of an interface with mobile stations UE.

For example, the mobile-station-side interface 11 is configured to establish an RRC connection (radio connection) with any of the mobile stations UE which camps on the femtocell or the macrocell, in a communication start procedure of the mobile station UE.

Moreover, the mobile-station-side interface 11 is configured to receive a location registration request signal from a mobile station UE having a location registration area changed therefore, through the aforementioned RRC connection, and to forward a location registration response signal transmitted from the exchange 20, to the mobile station UE.

Furthermore, the mobile-station-side interface 11 is configured, when the exchange 20 performs the location registration of the mobile station UE for a location registration area to which the femtocell belongs, to notify the mobile station UE of a frequency of the femtocell notified by the exchange 20, in an RRC connection release procedure after the location registration.

Specifically, the mobile-station-side interface 11 may be configured to notify the mobile station UE of the frequency of the femtocell by using "RRC CONNECTION RELEASE" in the aforementioned RRC connection release procedure.

The judgment unit 12 is configured to judge whether the aforementioned communication start procedure is performed through a femtocell (that is, the communication start procedure is one performed by the mobile station UE camps on the femtocell) or is performed through a macrocell (that is, the communication start procedure is one performed by the mobile station UE camps on the macrocell).

The exchange-side interface 13 is configured to fulfill a function of an interface with the exchange 20.

For example, the exchange-side interface 13 is configured to transmit, to the exchange 20, the location registration request signal transmitted from the mobile station UE visited the femtocell or the macrocell through the RRC connection established with the mobile station UE.

Note that the exchange-side interface 13 is configured to notify the exchange 20 of the frequency of the femtocell and a femtocell ID for uniquely identifying the femtocell which are held in the controller 10, in the communication start procedure of the mobile station UE camps on the femtocell.

Specifically, the exchange-side interface 13 may be configured to transmit "INITIAL UE MESSAGE" including the frequency of the femtocell and the femtocell ID which are described above, to the exchange 20.

Note that the exchange-side interface 13 may transmit frequency of the femtocell and the femtocell ID which are described above, while including them in "INITIAL UE MESSAGE" including the aforementioned location registration request signal.

Figure 3:
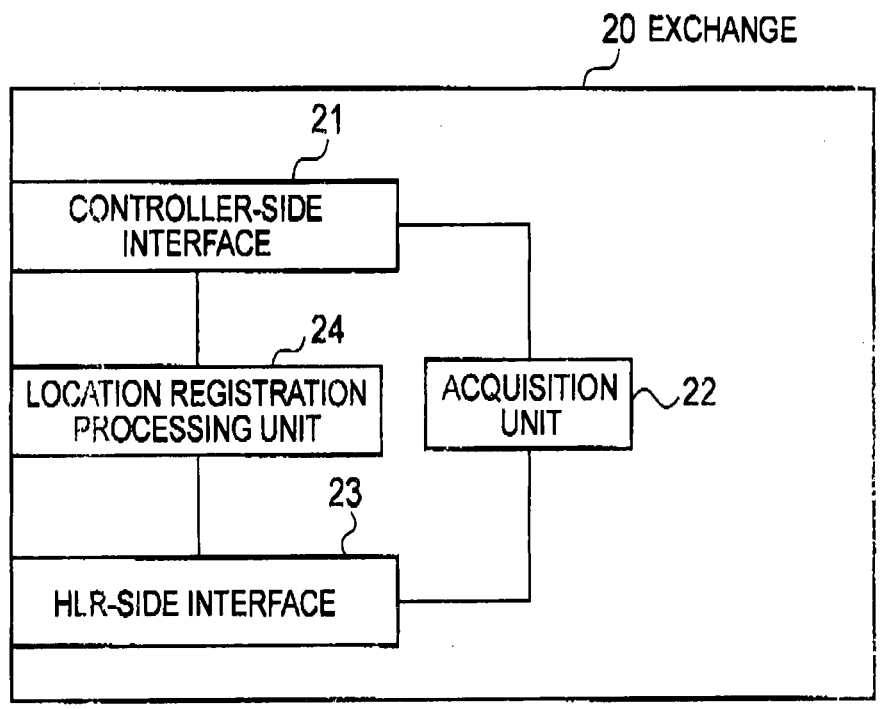
FIG. 3 is a functional block diagram of an exchange according to the first embodiment of the present invention.

As shown in FIG. 3, the exchange 20 includes a controller-side interface 21, an acquisition unit 22, an HLR-side interface 23, and a location registration processing unit 24.

The controller-side interface 21 is configured to fulfill a function of an interface with the controller 10.

The acquisition unit 22 is configured to acquire the frequency of the femtocell and the femtocell ID for uniquely identifying the femtocell which are held in the controller 10, through the controller-side interface 21 in the communication start procedure of the mobile Station UE camps on the femtocell.

For example, the acquisition unit 22 may be configured to acquire the frequency of the femtocell and the femtocell ID included in "INITIAL UE MESSAGE" transmitted by the controller 10.

The HLR-side interface 23 is configured to fulfill a function of an interface with an HLR 30.

For example, the HLR-side interface 23 is configured to store the frequency of the femtocell and the femtocell ID which are acquired, in association with a subscriber profile of the mobile station UE in cooperation with the HLR 30.

Specifically, the HLR-side interface 23 is configured to transmit, to the HLR 30, the frequency of the femtocell and the femtocell ID which are acquired, and a mobile-station ID (IMSI: International Mobile Subscriber Identity) for uniquely identifying the mobile station UE.

The location registration processing unit 24 is configured to perform location registration of the mobile station UE in cooperation with the HLR 30 in response to the location registration request signal transmitted by the controller 10.

For example, suppose a case where a location registration request signal transmitted by the controller 10 is a location registration request signal having been transmitted from the mobile station UE through an RRC connection established with a mobile station UE visiting a macrocell. The location registration processing unit 24 is configured to in this case perform the location registration of the mobile station UE for the location registration area to which a femtocell geographically overlaid with the microcell belongs, in cooperation with the HLR 30.

Specifically, in this case, in response to the location registration request signal, the location registration processing unit 24 instructs the HLR 30 to perform the location registration of the mobile station UE for the location registration area to which the femtocell belongs.

Meanwhile, the controller-side interface 21 is configured to notify the controller 10 of the aforementioned frequency of the femtocell in the RRC connection release procedure after the completion of the location registration of the mobile station UE.

For example, the controller-side interface 21 may be configured to notify the controller 10 of the frequency of the femtocell by using "IU RELEASE COMMAND" in the RRC connection release procedure after the completion of the location registration.

Figure 4:
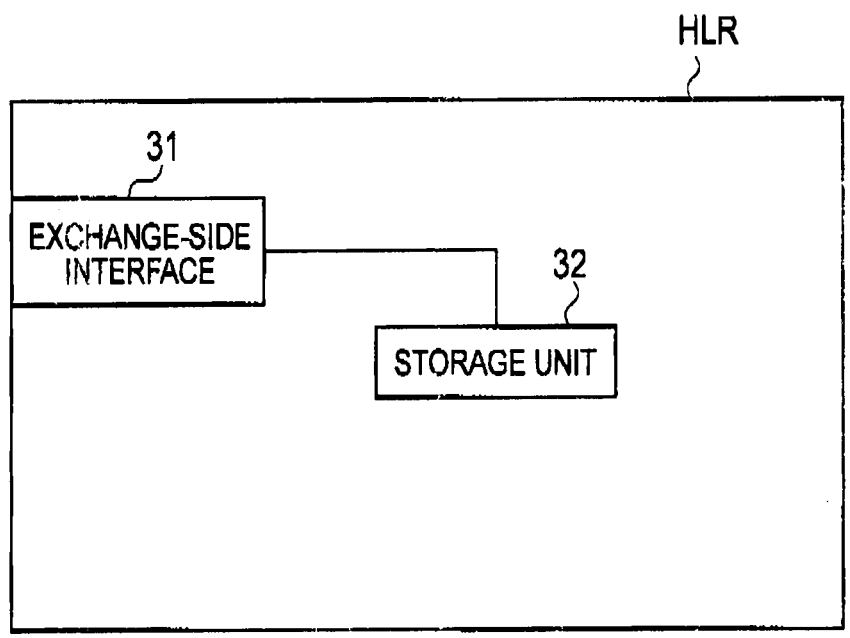
FIG. 4 is a functional block diagram of an HLR according to the first embodiment of the present invention.

As shown in FIG. 4, the HLR 30 includes an exchange-side interface 31 and a storage unit 32.

The exchange-side interface 31 is configured to fulfill a function of an interface with the exchange 20.

The storage unit 32 is configured to store subscriber profiles (subscriber information) of mobile stations UE.

For example, each of the subscriber profiles includes: an IMSI for uniquely identifying each mobile station UE; information on a service class for a subscriber which is required for controlling incoming and outgoing calls; information on a billing plan for a subscription by the user of the mobile station UE; information on the terminal type of the mobile station UE; information on a location registration area on which the mobile station UE visits; and the like.

Note that the exchange 20 may be configured to hold a copy of the subscriber profile to control various calls.

Meanwhile, the storage unit 32 is configured to update the information on a location registration area on which the mobile station UE visits, in response to an instruction from the exchange 20.

Figure 5:
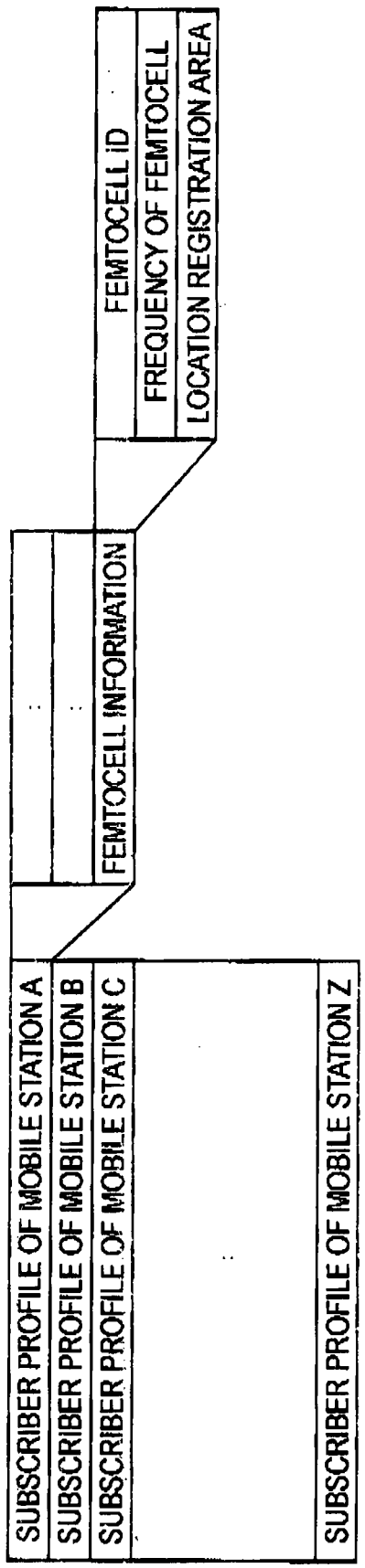
FIG. 5 is a diagram showing an example of storage contents of a storage unit of the HLR according to the first embodiment of the present invention.

In addition, as shown in FIG. 5, the storage unit 32 may store information (femtocell information of the mobile station UE) on femtocells accessible by the mobile station UE, in association with the subscriber profile.

The femtocell information includes a femtocell ID, a frequency of a femtocell, a location registration area, and the like.

Specifically, the storage unit 32 is configured to update, when an IMSI, a femtocell ID, and a frequency of a femtocell which are transmitted by the exchange 20 are received, a femtocell ID and a frequency of a femtocell included in femtocell information in a subscriber profile of a mobile station UE corresponding to the IMSI, with the femtocell ID and the frequency of the femtocell which are received.

In addition, the storage unit 32 is configured to in this case update a location registration area included in the femtocell information in the subscriber profile of the mobile station UE corresponding to the IMSI, as appropriate.

In this case, the storage unit 32 may also store information on a macrocell geographically overlaid with the femtocell, together.

Operation of Mobile Communication System
According to First Embodiment of Present Invention A description is given of an operation of the mobile communication system according to the first embodiment of the present invention by referring to FIG. 6 and FIG. 7.

Firstly, an operation performed at the time of starting communication through the femtocell 1 by a mobile station UE will be described by referring to FIG. 6.

As shown in FIG. 6, in Step S1001, the mobile station UE transmits "RRC CONNECTION REQUEST" requesting an establishment of an RRC connection, to the controller 10 through the femtocell 1.

In Step S1002, the radio network controller RNC transmits "RRC CONNECTION SETUP" to the mobile station UE. In Step S1003, the mobile station UE transmits "RRC CONNECTION SETUP COMPLETE" to the controller 10, and thereby the establishment of the RRC connection between the controller 10 and the mobile station UE is completed.

In Step S1004, the controller 10 detects the establishment of the aforementioned RRC connection through the femtocell 1, and transmits, to the exchange 20, "INITIAL UE MESSAGE" including the frequency f2 of the femtocell 1 and a femtocell ID for uniquely identifying the femtocell 1 which are held in the controller 10.

The "INITIAL UE MESSAGE" may be "INITIAL UE MESSAGE" transmitting a location registration request signal.

In Step S1006, the exchange 20 notifies the HLR 30 of the frequency f2 of the femtocell 1 and the femtocell ID included in "INITIAL UE MESSAGE" which has been received, and an IMSI of the mobile station UE.

In Step S1007, the HLR 30 updates the details of femtocell information in a subscriber profile of the mobile station UE based on the frequency f2 of the femtocell 1, the femtocell ID, and the IMSI of the mobile station UE which are notified of.

Secondly, an operation of performing location registration of a mobile station UE in the mobile communication system according to this embodiment will be described by referring to FIG. 7.

In an example in FIG. 7, the description is given of the operation performed in a case where the mobile station UE in a camp on state in a macrocell 1 operated at the frequency f1 moves to the macrocell 2 operated at the frequency f2. Note that the macrocell 1 and the macrocell 2 belong to different location registration areas.

As shown in FIG. 7, in Step S2001, the mobile station UE detects a change of a location registration area on which the mobile station UE visits, after moving to the macrocell 2. Specifically, the mobile station UE detects inequality between stored information (LAI: Location Area Identity) on a location registration area of the macrocell 1 and information (LAI) or a location registration area included in broadcast information in the macrocell 2. Then, the mobile station UE transmits "RRC CONNECTION REQUEST" requesting an establishment of an RRC connection, to the controller 10 through the macrocell 2.

In Step S2002, the controller 10 transmits "RRC CONNECTION SETUP" to the mobile station UE. In Step S2003, the mobile station UE transmits "RRC CONNECTION SETUP COMPLETE" to the controller 10, and thereby the establishment of the RRC connection between the controller 10 and the mobile station UE is completed.

In Step S2004, the mobile station UE transmits a location registration request signal (ROUTING AREA UPDATE REQUEST) to the controller 10 by using "INITIAL DIRECT TRANSFER" which is an RRC message.

In Step S2005, the controller 10 having received "INITIAL DIRECT TRANSFER" forwards the received location registration request signal by using "INITIAL UE MESSAGE" which is an RANAP message.

In step S2006, authentication and ciphering processing for the mobile station UE succeeds. Thereafter in step S2007, in cooperation with the HLR 30, the exchange 20 selects the femtocell 1 geographically overlaid with the macrocell 2 and accessible by the mobile station UE, and transmits a location registration response signal for permitting a location registration of the mobile station UE for a location registration area to which the femtocell 1 belongs, to the controller 10 by using "DIRECT TRANSFER" which is an RANAP message. In step S2008, the controller 10 forwards the received location registration response signal to the mobile station UE by using "DL DIRECT TRANSFER" which is an RRC message, and thereby the location registration of the mobile station UE for the location registration area to which the femtocell 1 belongs is completed (step S2009).

In Step S2010, the exchange 20 transmits "IU RELEASE COMMAND" including the aforementioned frequency f2 of the femtocell 1, to the controller 10.

In Step S2011, the controller 10 having received "IU RELEASE COMMAND" transmits "RRC CONNECTION RELEASE" including the aforementioned frequency f2 of the femtocell 1, to the mobile station UE, and thereby releases the aforementioned RRC connection.

Here, after the aforementioned RRC connection is released, the mobile station UE starts camping-on at the frequency f2 of the femtocell 1 included in "RRC CONNECTION RELEASE" which has been received.

Operations and Effects of Mobile Communication System According to First Embodiment of Present Invention With the mobile communication system according to the first embodiment of the present invention, the exchange 20 can acquire a frequency of a femtocell in a communication start procedure of a mobile station UE in a mobile communication system employing the W-CDMA scheme. Thus, provision of a protocol sequence is not required.

In addition, since a femtocell is required to allow a subscriber to easily install the femtocell in a home as described above, inclusion of a plug-and-play function in a femto radio base station BTS has been discussed.

For example, an example of the plug-and-play function includes a function of appropriately changing a used frequency according to interference or the like from cells neighboring the femtocell.

However, even if the frequency of the femtocell is dynamically changed by using the plug-and-play function, the exchange 20 can appropriately acquire the frequency of the most recent femtocell with the mobile communication system according to the first embodiment of the present invention.

The features of this embodiment described above may be expressed as follows.

A first feature of this embodiment is summarized as follows. A mobile communication method includes: step A of, in a communication start procedure of a mobile station UE camps on the femtocell 1, acquiring, by the exchange 20, the frequency f2 of the femtocell 1 and the femtocell ID for uniquely identifying the femtocell 1 which are held in the controller 10; step B of storing, by the exchange 20 and the HLR 30, the acquired frequency f2 of the femtocell 1 and the acquired femtocell ID in association with a subscriber profile (subscriber information) of the mobile station UE; step C of transmitting the location registration request signal to the exchange 20 by the controller 10, the location registration request signal having been transmitted from the mobile station UE visiting the macrocell 2 through the RRC connection (radio connection) established with the mobile station UE; step D of performing, by the exchange 20 and the HLR 30, the location registration, of the mobile station UE for the femtocell 1 geographically overlaid with the macrocell 2, in response to the received location registration request signal; in the release procedure of the RRC connection after completion of the location registration, step E of notifying, by the exchange 20, the controller 10 of the frequency f2 of the femtocell 1, and of notifying, by the controller 10, the mobile station UE of the notified frequency f2 of the femtocell 1; and step F of starting, by the mobile station UE, camps on the notified frequency f2 of the femtocell 1.

In the first feature of this embodiment, in the step A, the controller 10 may transmit "INITIAL UE MESSAGE" including the frequency f2 of the femtocell 1 and the femtocell ID to the exchange 20, and the exchange 20 may acquire the frequency f2 of the femtocell 1 and the femtocell ID included in "INITIAL UE MESSAGE."

In the first feature of this embodiment, in the step E, the exchange 20 may notify the controller 10 of the frequency f2 of the femtocell 1 by using "IU RELEASE COMMAND," and the controller 10 may notify the mobile station UE of the frequency f2 of the femtocell 1 by using "RRC CONNECTION RELEASE."

A second feature of this embodiment is summarized as follows. The controller 10 includes: the exchange-side interface 13 configured, in the communication start procedure of the mobile station UE camps on the femtocell 1, to notify the exchange 20 of the frequency f2 of the femtocell 1 and the femtocell ID for uniquely identifying the femtocell 1 which are held in the controller 10, and configured to transmit the location registration request signal to the exchange 20, the location registration request signal having been transmitted from the mobile station UE visiting the macrocell 2 through the RRC connection established with the mobile station UE; and the mobile-station-side interface 11 configured to notify the mobile station UE of the frequency f2 of the femtocell 1 notified by the exchange 20 in the release procedure for the RRC connection after the location registration, when the exchange 20 performs the location registration of the mobile station UE for the femtocell 1 geographically overlaid with the macrocell 2 in response to the received location registration request signal.

In the second feature of this embodiment, the exchange-side interface 13 may be configured to transmit "INITIAL UE MESSAGE" including the frequency f2 of the femtocell 1 and the femtocell ID, to the exchange 20.

In the second feature of this embodiment, the mobile-station-side interface 11 may be configured to notify the mobile station UE of the frequency f2 of the femtocell 1 by using "RRC CONNECTION RELEASE."

A third feature of this embodiment is summarized as follows. The exchange 20 includes: the acquisition unit 22 configured, in the communication start procedure for the mobile station UE camps on the femtocell 1, to acquire the frequency f2 of the femtocell 1 and the femtocell ID for uniquely identifying the femtocell 1 which are held in the controller 10; the HLR-side interface 23 configured to store the acquired frequency f2 of the femtocell 1 and the acquired femtocell ID in association with the subscriber profile of the mobile station UE in cooperation with the HLR 30, and configured to perform location registration, when the controller 10 sends the exchange 20 the location registration request signal transmitted from the mobile station UE through the RRC connection established with the mobile station UE, to register the mobile station UE visiting the macrocell 2 for the femtocell 1 geographically overlaid with the macrocell 2, in response to the received location registration request signal; and the controller-side interface 21 configured to notify the controller 10 of the frequency f2 of the femtocell 1 in the release procedure of the RRC connection after the location registration.

In the third feature of this embodiment, the acquisition unit 22 may be configured to acquire the frequency f2 of the femtocell 1 and the femtocell ID which are included in "INITIAL UE MESSAGE" transmitted by the controller 10.

In the third feature of this embodiment, the controller-side interface 21 may be configured to notify the controller 10 of the frequency f2 of the femtocell 1 by using "IU RELEASE COMMAND."

Note that the above described operations of the mobile station UE, the macro radio base station BTS, the femto radio base station BTS, the controller 10, the exchange 20, and the HLR 30 may be implemented by hardware, may be implemented by a software module executed by a processor, or may be implemented by a combination of both.

The software module may be provided in any type of storage medium such as a RAM (Random Access Memory), a flash memory, a ROM (Read Only Memory), an EPROM (Erasable Programmable ROM), an EEPROM (Electronically Erasable and Programmable ROM), a register, a hard disk drive, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, the macro radio base station BTS, the femto radio base station BTS, the controller 10, the exchange 20, and the HLR 30. Also, the storage medium and the processor may be provided in the mobile station UE, the macro radio base station BTS, the femto radio base station BTS, the controller 10, the exchange 20; and the HLR 30 as a discrete component.

Hereinabove, the present invention has been described in detail using the above embodiment; however, it is apparent to those skilled in the art that the present invention is not limited to the embodiment described herein. Modifications and variations of the present invention can be made without departing from the scope of the present invention defined by the description of the scope of claims. Thus, what is described herein is for illustrative purpose, and has no intention whatsoever to limit the present invention.

Note that the entire content of Japanese Patent Application No. 2009-130826 (filed on May 29, 2009) is incorporated herein by reference.

INDUSTRIAL APPLICABILITY

The present invention can provide a mobile communication method, a controller, and an exchange which are capable of performing location registration to register a mobile station UE allowed to access a femtocell, preferentially for a location registration area to which the femtocell belongs, and thus is useful in a mobile communication field.

EXPLANATION OF THE REFERENCE NUMERALS

BTS . . . femto radio base station, macro radio base station
UE . . . mobile station
10 . . . controller
11 . . . mobile-station-side interface
12 . . . judgment unit
13, 31 . . . exchange-side interface
20 . . . exchange
21 . . . controller-side interface
22 . . . acquisition unit
23 . . . HLR-side interface
24 . . . location registration processing unit
30 . . . HLR
32 . . . storage unit

The invention claimed is:

1. A mobile communication method comprising:
acquiring, by an exchange, in a communication start procedure of mobile station camps on a femtocell, a frequency of the femtocell and a femtocell ID for uniquely identifying the femtocell which are held in a controller;
storing, by the exchange and a home location register, the acquired frequency of the femtocell and the acquired femtocell ID in association with subscriber information of a mobile station;
judging, by the controller, whether the communication start procedure by the mobile station is performed through the femtocell or through a macrocell;
transmitting a location registration request signal to the exchange by the controller when the communication start procedure is performed through the femtocell, the location registration request signal having been transmitted from the mobile station visiting the macrocell through a radio connection established with the mobile station;
performing, by the exchange and the home location register, location registration to register the mobile station for a location registration area to which the femtocell geographically overlaid with the macrocell belongs, in response to the received location registration request signal;
notifying, by the exchange, in a release procedure of the radio connection after completion of the location registration, the controller of the frequency of the femtocell, and notifying, by the controller, in the release procedure, the mobile station of the notified frequency of the femtocell; and
starting, by the mobile station, camps on the notified frequency of the femtocell,
wherein, in the communication start procedure of the mobile station camps, the controller transmits an "INITIAL UE MESSAGE" including the frequency of the femtocell and the femtocell ID to the exchange, and the exchange acquires the frequency of the femtocell and the femtocell ID included in the "INITIAL UE MESSAGE."

2. A mobile communication method comprising:
acquiring, by an exchange, in a communication start procedure of mobile station camps on a femtocell, a frequency of the femtocell and a femtocell ID for uniquely identifying the femtocell which are held in a controller;
storing, by the exchange and a home location register, the acquired frequency of the femtocell and the acquired femtocell ID in association with subscriber information of a mobile station;
judging, by the controller, whether the communication start procedure by the mobile station is performed through the femtocell or through a macrocell;
transmitting a location registration request signal to the exchange by the controller when the communication start procedure is performed through the femtocell, the location registration request signal having been transmitted from the mobile station visiting the macrocell through a radio connection established with the mobile station;
performing, by the exchange and the home location register, location registration to register the mobile station for a location registration area to which the femtocell geographically overlaid with the macrocell belongs, in response to the received location registration request signal;
notifying, by the exchange, in a release procedure of the radio connection after completion of the location registration, the controller of the frequency of the femtocell, and notifying, by the controller, in the release procedure, the mobile station of the notified frequency of the femtocell; and
starting, by the mobile station, camps on the notified frequency of the femtocell,
wherein, in the release procedure, the exchange notifies the controller of the frequency of the femtocell by using an "IU RELEASE COMMAND," and the controller notifies the mobile station of the frequency of the femtocell by using a "RRC CONNECTION RELEASE."

3. A controller comprising:
an exchange notification unit configured to, in a communication start procedure of mobile station camps on a femtocell, notify an exchange of a frequency of the femtocell and a femtocell ID for uniquely identifying the femtocell which are held in the controller;
a judgment unit configured to judge whether the communication start procedure by a mobile station is performed through the femtocell or through a macrocell;
a location registration request signal transmission unit configured to transmit a location registration request signal to the exchange when the communication start procedure is performed through the femtocell, the location registration request signal having been transmitted from the mobile station visiting the macrocell through a radio connection established with the mobile station; and
a mobile-station notification unit configured to notify the mobile station of the frequency of the femtocell notified by the exchange in a release procedure for the radio connection after location registration, when the exchange performs the location registration to register the mobile station to a location registration area to which the femtocell geographically overlaid with the macrocell belongs in response to the received location registration request signal,
wherein, in the communication start procedure of the mobile station camps, the exchange notification unit transmits an "INITIAL UE MESSAGE" including the frequency of the femtocell and the femtocell ID, to the exchange.

4. A controller comprising:
an exchange notification unit configured to, in a communication start procedure of mobile station camps on a femtocell, notify an exchange of a frequency of the femtocell and a femtocell ID for uniquely identifying the femtocell which are held in the controller;
a judgment unit configured to judge whether the communication start procedure by a mobile station is performed through the femtocell or through a macrocell;
a location registration request signal transmission unit configured to transmit a location registration request signal to the exchange when the communication start procedure is performed through the femtocell, the location registration request signal having been transmitted from the mobile station visiting the macrocell through a radio connection established with the mobile station; and
a mobile-station notification unit configured to notify the mobile station of the frequency of the femtocell notified by the exchange in a release procedure for the radio connection after location registration, when the exchange performs the location registration to register the mobile station to a location registration area to which the femtocell geographically overlaid with the macrocell belongs in response to the received location registration request signal,
wherein, in the release procedure, the mobile-station notification unit is configured to notify the mobile station of the frequency of the femtocell by using a "RRC CONNECTION RELEASE."

5. An exchange, comprising:
an acquisition unit configured to, in a communication start procedure for mobile station camps on a femtocell, acquire a frequency of the femtocell and a femtocell ID for uniquely identifying the femtocell which are held in a controller;
a storage unit configured to store the acquired frequency of the femtocell and the acquired femtocell ID in association with subscriber information of a mobile station in cooperation with a home location register;
a location registration processing unit configured to perform location registration, when the controller sends the exchange a location registration request signal transmitted from the mobile station through a radio connection with the mobile station, to register the mobile station visiting a macrocell for a location registration area to which the femtocell geographically overlaid with the macrocell belongs, in response to the location registration request signal; and
a controller notification unit configured to notify the controller of the frequency of the femtocell in a release procedure of the radio connection after the location registration,
wherein, in the communication start procedure for the mobile station camps, the acquisition unit acquires the frequency of the femtocell and the femtocell ID which are included in an "INITIAL UE MESSAGE" transmitted by the controller,
wherein the controller judges whether the communication start procedure by the mobile station is performed through the femtocell or through the macrocell, and
wherein when the communication start procedure is performed through the femtocell, the location registration processing unit receives the location registration request signal from the controller.

6. An exchange, comprising:
an acquisition unit configured to, in a communication start procedure for mobile station camps on a femtocell, acquire a frequency of the femtocell and a femtocell ID for uniquely identifying the femtocell which are held in a controller;
a storage unit configured to store the acquired frequency of the femtocell and the acquired femtocell ID in association with subscriber information of a mobile station in cooperation with a home location register;
a location registration processing unit configured to perform location registration, when the controller sends the exchange a location registration request signal transmitted from the mobile station through a radio connection with the mobile station, to register the mobile station visiting a macrocell for a location registration area to which the femtocell geographically overlaid with the macrocell belongs, in response to the location registration request signal; and
a controller notification unit configured to notify the controller of the frequency of the femtocell in a release procedure of the radio connection after the location registration,
wherein, in the release procedure, the controller notification unit notifies the controller of the frequency of the femtocell by using a "IU RELEASE COMMAND,"
wherein the controller judges whether the communication start procedure by the mobile station is performed through the femtocell or through the macrocell, and
wherein when the communication start procedure is performed through the femtocell, the location registration processing unit receives the location registration request signal from the controller.

* * * * *